United States Patent
Hayat-Dawoodi

(10) Patent No.: US 6,369,650 B1
(45) Date of Patent: Apr. 9, 2002

(54) IMPEDANCE SYNTHESIS AND DC BIASING METHOD AND ARCHITECTURE FOR DSL/CABLE LINE DRIVERS

(75) Inventor: Kambiz Hayat-Dawoodi, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/725,623

(22) Filed: Nov. 29, 2000

(51) Int. Cl.[7] .............................. H04M 1/00; H04M 9/00
(52) U.S. Cl. ..................... 330/69; 330/146; 379/391; 379/402; 379/399.01
(58) Field of Search .................. 379/391, 402, 379/399.01, 395, 394; 330/69, 146

(56) References Cited

U.S. PATENT DOCUMENTS

| | | | |
|---|---|---|---|
| 4,377,858 A | * 3/1983 | Treiber | 379/402 |
| 4,485,277 A | * 11/1984 | Minch et al. | 379/402 |
| 4,798,982 A | * 1/1989 | Voorman | 379/402 |
| 5,054,062 A | * 10/1991 | Molnar | 379/402 |
| 5,133,007 A | * 7/1992 | Nishimura | 379/402 |
| 5,333,194 A | * 7/1994 | Caesar | 379/402 |
| 5,444,777 A | * 8/1995 | Condon et al. | 379/402 |
| 5,526,425 A | * 6/1996 | Meyer et al. | 379/402 |
| 5,623,543 A | * 4/1997 | Cook | 379/402 |
| 5,802,169 A | * 9/1998 | Frantz et al. | 379/402 |
| 5,896,420 A | * 4/1999 | Kaku et al. | 379/402 |

\* cited by examiner

*Primary Examiner*—Michael B Shingleton
(74) *Attorney, Agent, or Firm*—Dwight N. Holmbo; Wade James Brady III; Frederick J. Telecky, Jr.

(57) ABSTRACT

A low noise, low distortion, power efficient DSL/cable line driver has a double Wheatstone impedance bridge network that functions to prevent contamination of DSL signals that are received by and transmitted from the line driver. The line driver employs an external current sensing impedance that can be either purely resistive or complex and that can be selected to accommodate a particular transmission medium. The line driver further employs an internal programmable resistor that can be programmably adjusted to accommodate changes in transmission medium impedance to optimize sidetone rejection.

24 Claims, 1 Drawing Sheet

IMPEDANCE SYNTHESIS AND DC BIASING METHOD AND ARCHITECTURE FOR DSL/CABLE LINE DRIVERS

BACKGROUND OF THE INVENTION

1. Field of the Invention

This invention relates generally to digital subscriber lines (DSL's), and more particularly to a low distortion, power efficient DSL/Cable line driver that employs DC biasing and impedance synthesis without using a series resistor to achieve impedance matching.

2. Description of the Prior Art

Asymmetric digital subscriber lines (ADSL) can supply the necessary bandwidth for applications such as fast access to the Internet, video conferencing, interactive multimedia, and Video-on-Demand. This technology is designed to solve the most severe bottleneck in the data access network between the Central Office and the customer, or end-user.

ADSL is a new modem technology that converts existing copper telephone lines into access paths for multimedia and high speed data communications, and maintains the regular telephone voice services. ADSL provides data rates that expand the best existing access capacity (i.e., ISDN) by a factor of 60 or more, and the best existing common analog access capacity (i.e., V.34 modems) by a factor of 300, without requiring any new cabling. ADSL can practically transform the existing public information network from one limited to voice, text and low resolution graphics to a powerful, ubiquitous system capable of carrying multimedia, including full motion video, to everyone's home.

Rate adaptive ADSL delivers any data rate from 64kbps to 8.192Mbps on the downstream channels to the subscribers and any data rates from 16kbps to 768kbps on the upstream channels back to the network, while simultaneously providing lifeline POTS (Plain Old Telephone Service), all over a single twisted copper wire pair. The downstream and upstream channels can be split to several sub-channels (up to 4 sub-channels on the downstream and 3 bi-directional sub-channels) to serve several applications simultaneously.

The ADSL operates over a single, unconditioned twisted copper pair of wires. Its connection is via modem pairs, one at the user end and the second at the Central Office. The ANSI T1 committee has standardized Discrete Multi-Tone (DMT) as the line code to be used in the ADSL transmission system, due to its unique ability to overcome the severe distortion of the copper line at this frequency band. DMT also matches well the typical noise and impulses which exist in the residential twisted-wire pair environment. DMT divides the channel into a number of sub-channels, referred to as tones, each of which is QAM-modulated on a separate carrier. The carrier frequencies are multiples of one basic frequency. The available spectrum ranges from about 20 kHz to 1.104 MHz, while the low 20kHz are reserved for voice service (POTS). Noise and channel conditions are constantly measured for each tone separately to achieve optimal transmission at any time.

A common strategy for implementing ADSL modem technology is to ensure that the input impedance of an analog front end (AFE), looking into the subscriber loop port, matches the loop characteristic impedance. This has traditionally been accomplished by placing a network that closely matches the loop characteristic impedance between the AFE line driver output and the subscriber loop (or transformer coupling to the subscriber loop). A disadvantage associated with such schemes is that half of the line driver output signal power is dissipated on this terminating network. In view of the foregoing, a need exists for a low noise, power efficient, actively terminated line driver that avoids terminating network signal power loss. One method of active termination is disclosed in U.S. Pat. No. 4,798,982, issued Jan. 17, 1989 to Voorman, that is entitled *Active Symmetrical Balance Hybrid Circuit*. The scheme disclosed and claimed by Voorman, however, exhibits distortion that is too high for use in most DSL technologies. It is therefore desirable to provide a DSL line driver scheme that employs active elements, but which also reduces the size and number of passive elements to achieve reductions in both distortion and power dissipation.

SUMMARY OF THE INVENTION

The present invention is directed to a low distortion, power efficient DSL/cable line driver that is devoid of series resistors to accommodate impedance matching. The line driver further acts as part of line termination circuitry to achieve good side tone rejection and achieves very low to no DC loss in transformer connected architectures because of accurate feedback based DC level biasing. One embodiment of the invention combines active termination and sidetone cancellation in a double Wheatstone bridge architecture such that a transmit signal is cancelled at the input of the receiver amplifier and such that a received signal is terminated by the transmitter amplifier. The line driver further has a receiver amplifier that preferably employs a programmable resistor configured within a resistor network to optimize side tone rejection characteristics over a wide range of line impedances. The line driver employs both negative feedback and positive feedback in combination with DC biasing to minimize DC offset voltages occurring across an output transformer when the line driver is used in a differential application such as ADSL.

In one aspect of the invention, a DSL/cable line driver is implemented using a differential receive amplifier in combination with an actively terminated transmitter driver to effectively reject a transmitted signal while applying at least unity gain to the received signal.

In another aspect of the invention, a DSL/cable line driver is implemented using a differential receive amplifier in combination with an actively terminated transmitter driver to provide a line driver that is more power efficient than a conventional passively terminated line driver.

In still another aspect of the invention, a DSL/cable line driver is implemented using a differential receive amplifier in combination with an actively terminated transmitter driver using accurate feedback based DC level biasing to achieve very low to no DC loss in transformer connected architectures and good sidetone rejection.

In still another aspect of the invention, a DSL/cable line driver is implemented by combining active termination and sidetone rejection circuitry in a double Wheatstone bridge architecture.

BRIEF DESCRIPTION OF THE DRAWINGS

Other aspects and features of the present invention will be readily appreciated, as the same become better understood by reference to the following detailed description when considered in connection with the accompanying drawings wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
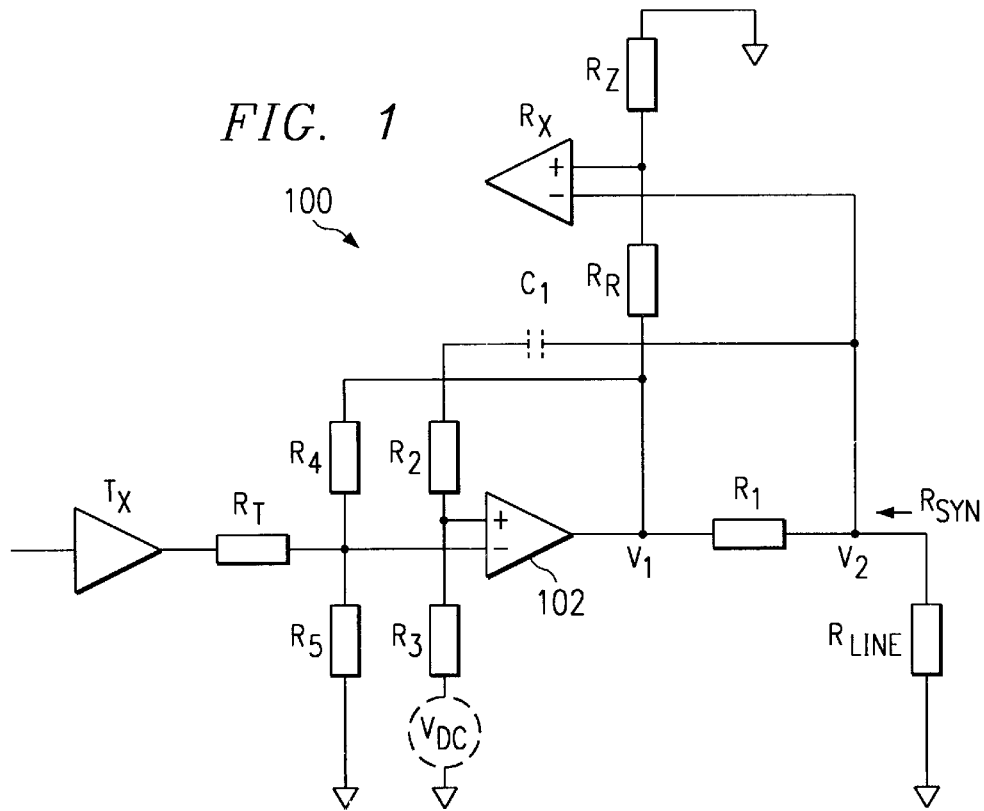
FIG. 1 is a schematic diagram illustrating a DSL/cable line driver configured to reject the transmitted signal while applying gain to the received signal using an actively terminated line driver circuit according to one embodiment of the present invention.

FIG. 1 is a schematic diagram illustrating a single-ended DSL/cable line driver 100 configured to reject a transmitted signal while applying gain to the received signal using an actively terminated line driver circuit according to one embodiment of the present invention. The line driver 100 is seen to be driven by an analog front end that includes AFE amplifier $T_X$ and a series termination resistor $R_T$. Specifically, line driver 100 includes a receive amplifier $R_X$ and a transmit amplifier 102. The transmit amplifier 102 has a negative input that is connected to one end of the series termination resistor $R_T$ that forms the output node for the analog front end. The transmit amplifier 102 negative input is also connected to a common ground through a resistor $R_5$ and is further connected through a resistor $R_4$ to the output of the transmit amplifier 102. The transmit amplifier 102 also has a positive input that is connected through a resistor $R_3$ to a DC bias voltage $V_{DC}$ and further connected through a resistor $R_2$ in series with a capacitor $C_1$ to the transmission medium $R_{Line}$. A sensing resistor $R_1$ is connected at one end to the output of the transmit amplifier 102 and at its opposite end to the transmission medium $R_{Line}$. The transmission medium $R_{Line}$ is also connected to the negative input of the receive amplifier $R_X$. The output of the transmit amplifier 102 is also connected via a resistor $R_R$ to the positive input of the receive amplifier $R_X$. Another resistor $R_Z$ is also connected between the positive input of the receive amplifier $R_Z$ and the common ground. The line driver 100 provides return loss (side tone rejection) circuitry including resistors $R_1$, $R_R$ and $R_Z$ in combination with load resistance $R_{Line}$, to achieve good side tone rejection. Setting $R_R/R_Z=R_1/R_{Line}$, for example, ensures that the transmit signal generated by the analog front end transmit amplifier $T_X$ is cancelled at the input of the line driver receive amplifier $R_X$. Resistor $R_Z$ at the positive input to the line driver receive amplifier $R_X$ is most preferably programmable using a signal processing device such as a DSP, for example, in order to accommodate a wide range of line impedances $R_{Line}$. This programmability provides versatility such that the same line driver 100 can be used to accommodate a variety of line terminations with optimized sidetone rejection. Resistor $R_Z$ is therefore seen to improve the side tone rejection associated with the line driver receiver amplifier $R_X$ in response to changes in transmission line impedance $R_{Line}$.

In like manner, setting $$V_1 \frac{(R_5 \| R_T)}{R_4 + (R_5 \| R_T)} = V_2 \frac{R_3}{R_3 + R_2},$$

and letting $$x = \frac{(R_5 \| R_T)}{R_4 + (R_5 \| R_T)}$$

and $$y = \frac{R_3}{R_3 + R_2}$$

yields $$R_{syn} = \frac{V_2 - V_1}{V_2} R_1,$$

wherein substituting for $$V_1 = V_2 \frac{y}{x}$$

produces a synthesized resistance $$R_{syn} = \frac{V_2(1 - y/x)}{V_2} R_1 = (1 - y/x) R_1$$

looking into the line driver from the transmission medium.

Figure 2:
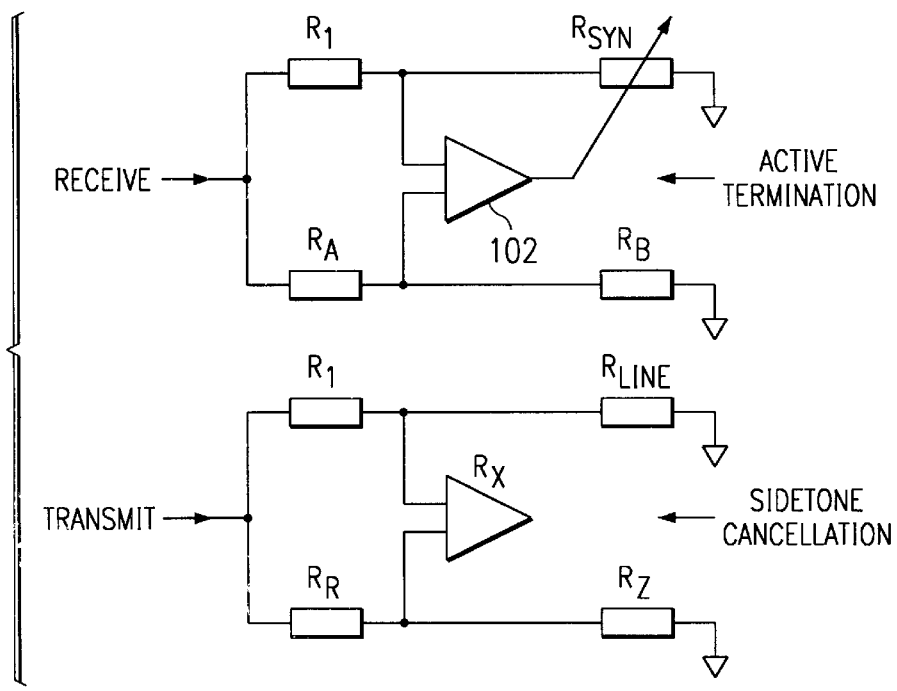
FIG. 2 is a schematic diagram illustrating the DSL/cable line driver shown in FIG. 1 symbolically implemented using a double Wheatstone bridge architecture.

With reference now to FIG. 2, the line driver 100 is seen symbolically to be implemented using a double Wheatstone bridge architecture wherein resistors $R_1$, $R_{Line}$, $R_R$ and $R_Z$ define the four legs of the double Wheatstone bridge looking into the transmission medium ($R_{Line}$), and resistors $R_1$, $R_{syn}$, $R_A$ and $R_B$ define the four legs of the double Wheatstone bridge looking into the line driver 100 from the transmission medium ($R_{Line}$). A DC voltage source $V_{DC}$ and DC blocking capacitor $C_1$, depicted in FIG. 1, function in a feedback loop to define the DC voltage level at node $V_1$, and also allows separate DC and AC impedances to better optimize the line driver 100, wherein $$V_1(DC) = V_{DC}\left(1 + \frac{R_4}{R_5 \| R_T}\right).$$

The present inventor found the line driver 100 to achieve very low to no DC loss in transformer connected architectures because of the accurate feedback based DC level biasing. A significant advantage provided by the line driver architecture depicted in FIG. 1 is that the sensing resistor $R_1$ can be characterized also as a complex impedance as well as simply a purely resistive impedance. The sensing resistor $R_1$ is most preferably external to the line driver 100 such that the end user can select a value necessary to accommodate a desired application (Ethernet, for example). This feature then allows the line driver 100 to be utilized in a wider variety of communication applications, including for example, audio applications as well as ADSL applications. Another advantage provided by the line driver architecture depicted in FIG. 1 is that it can be used in applications that do not require a transformer as well as applications that do require a transformer.

In summary explanation of the foregoing, the line driver 100 therefore combines active termination and side tone rejection circuitry in a double Wheatstone bridge architecture such that a transmit signal generated via an AFE transmitter driver ($T_X$) is cancelled at the input of the line driver receiver amplifier ($R_X$) and such that an active termination is implemented by the line driver transmit amplifier 102 and its feedback circuitry. As stated herein before, the line driver side tone rejection circuitry most preferably employs a programmable resistor $R_Z$ configured within a resistor network including $R_1$, $R_R$ and $R_Z$ in combination with load resistance $R_{Line}$, to optimize side tone rejection characteristics over a wide range of line impedance. The line driver 100 further employs both negative feedback and positive feedback in combination with DC biasing to minimize DC offset voltages occurring across an output transformer when the line driver 100 is used in a differential application such as ADSL.

In view of the above, it can be seen the present invention presents a significant advancement in the art of DSL/cable line driver technology. Further, this invention has been described in considerable detail in order to provide those skilled in the DSL communication art with the information needed to apply the novel principles and to construct and use such specialized components as are required. In view of the foregoing descriptions, it should further be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow so long as the combinations achieve a DSL/cable line driver according to the inventive principles set forth herein above.

What is claimed is:

1. A DSL/cable line driver comprising:
   a line driver transmit amplifier having an output, a positive input and a negative input;
   a line driver receive amplifier having a positive input and a negative input; and
   a double Wheatstone bridge impedance network connected to the output and the positive and negative inputs of the line driver transmit amplifier and further connected to the positive and negative inputs of the line driver receive amplifier, wherein the double Wheatstone bridge impedance network is configured to substantially prevent line driver transmit amplifier signals from appearing at the input to the line driver receive amplifier and further to provide active termination to signals received from the transmission medium.

2. The DSL/cable line driver according to claim 1 wherein the double Wheatstone bridge impedance network comprises a programmable resistor connected between the positive input of the line driver receive amplifier and a common ground, wherein the programmable resistor is operational to prevent signals generated by the line driver transmit amplifier from being amplified by the line driver receive amplifier in response to changes in transmission line impedance.

3. The DSL/cable line driver according to claim 1 wherein the double Wheatstone bridge impedance network comprises a DC blocking capacitor coupled between the positive input of the line driver transmit amplifier and a transmission medium, and further comprises a DC voltage source coupled between the positive input of the line driver and a common ground, wherein the DC blocking capacitor, DC voltage source and line driver form a feedback loop that is operational to define a DC voltage level at the output of the line driver transmit amplifier and further operational to optimize DSL/cable line driver performance in response to changes in transmission line impedance.

4. A DSL/cable line driver comprising:
   a first amplifier having a positive input and a negative input;
   a second amplifier having a positive input, a negative input and an output;
   a common ground;
   a DC voltage source;
   a first resistor connected at one end to the first amplifier positive input and connected at its opposite end to the common ground;
   a second resistor connected at one end to the first amplifier positive input and connected at its opposite end to the second amplifier output;
   an impedance connected at one end to the second amplifier output and connected at its opposite end to the first amplifier negative input and further to a transmission medium;
   a third resistor connected at one end to the second amplifier negative input and connected at its opposite end to the second amplifier output;
   a fourth resistor connected at one end to the second amplifier negative input and connected at its opposite end to the common ground;
   a fifth resistor connected at one end to the second amplifier positive input and connected at its opposite end to the DC voltage source;
   a sixth resistor connected at its first end to the second amplifier positive input; and
   a feedback capacitor connected between a second end of the sixth resistor and the first amplifier negative input.

5. The DSL/cable line driver according to claim 4 wherein the impedance is purely resistive.

6. The DSL/cable line driver according to claim 4 wherein the impedance is complex.

7. The DSL/cable line driver according to claim 4 wherein the first resistor is programmable.

8. The DSL/cable line driver according to claim 4 wherein the impedance is external to the DSL line driver.

9. The DSL/cable line driver according to claim 4 wherein the first, second, third, fourth, fifth and sixth resistors, the impedance, and an impedance associated with the transmission medium are operative as a double Wheatstone bridge to prevent signals generated by the second amplifier from being amplified by the first amplifier and further to actively terminate the signals received via the transmission medium.

10. A DSL/cable line driver comprising:
    a receive difference amplifier coupled to a transmission line current sensing impedance and operational in response to a voltage at one end of the current sensing impedance and a voltage at the opposite end of the current sensing impedance to generate a receive output difference signal therefrom; and
    a transmit difference amplifier operational in response to the voltage at one end of the transmission line current sensing impedance and the voltage at the opposite end of the transmission line current sensing impedance, and further in response to an analog input signal to generate a transmit output difference signal therefrom, wherein the current sensing impedance comprises one element of a double Wheatstone bridge network that is operative to prevent the transmit output difference signal from being amplified by the receive difference amplifier and further operative to terminate signals received via the transmission medium.

11. The DSL/cable line driver according to claim 10 wherein the transmission line current sensing impedance is purely resistive.

12. The DSL/cable line driver according to claim 10 wherein the transmission line current sensing impedance is complex.

13. The DSL/cable line driver according to claim 10 further comprising a DC voltage source and a DC blocking capacitor configured in a feedback loop to define a transmit difference amplifier output voltage, wherein the feedback loop is operative to allow separate DC and AC impedances to optimize the line driver in response to changes in the transmission line current sensing impedance.

14. The DSL/cable line driver according to claim 10 wherein the double Wheatstone bridge network further comprises a programmable resistor responsive to the voltage at one end of the transmission line current sensing impedance such that changes in the transmit output difference signal caused by changes in transmission line impedance can be cancelled at receive difference amplifier signal inputs.

15. A DSL/cable line driver comprising:
   means for sensing a transmission medium current and generating a plurality of voltage signals thereof;
   means for generating a first difference signal in response to the plurality of voltage signals when the transmission medium current is generated by the DSL/cable line driver;
   means for generating a second difference signal in response to the plurality of voltage signals when the transmission medium current is not generated by the DSL/cable line driver; and
   means for selectively adjusting the first and second difference signals in response to a change in transmission medium impedance.

16. The DSL/cable line driver according to claim 15 wherein the means for sensing a transmission medium current comprises an impedance external to the line driver.

17. The DSL/cable line driver according to claim 16 wherein the impedance is purely resistive.

18. The DSL/cable line driver according to claim 16 wherein the impedance is complex.

19. The DSL/cable line driver according to claim 15 wherein the means for generating a first difference signal and the means for generating a second difference signal each comprise a difference amplifier.

20. The DSL/cable line driver according to claim 15 wherein the means for selectively adjusting the first and second difference signals comprises a double Wheatstone bridge network.

21. The DSL/cable line driver according to claim 20 wherein the double Wheatstone bridge network comprises at least one programmable resistor.

22. A method of amplifying upstream signals received by an actively terminated analog front end line driver from a digital subscriber loop (DSL) comprising the steps of:
   providing a double Wheatstone impedance network operative to generate a first plurality of voltage signals in response to transmitted DSL signals and further operative to generate a second plurality of voltage signals in response to received DSL signals;
   providing a first difference amplifier capable of discriminating between transmitted DSL signals and received DSL signals in response to the first and second plurality of voltage signals;
   providing a second difference amplifier capable of discriminating between transmitted DSL signals and received DSL signals in response to the first and second plurality of voltage signals; and
   sensing signals generated by the actively terminated analog front end line driver and signals received from the DSL such that only the first difference amplifier can process the received DSL signals and further such that only the second difference amplifier can process the transmitted DSL signals.

23. The method of amplifying upstream signals received by an actively terminated analog front end line driver from a DSL according to claim 22 wherein the step of sensing signals generated by the actively terminated analog front end line driver and signals received from the ADSL comprises sensing a voltage difference across a selectable current sensing resistor.

24. The method of amplifying upstream signals received by an actively terminated analog front end line driver according to claim 22 further comprising the step of programmably changing impedance characteristics associated with the double Wheatstone bridge network to accommodate changes in transmission medium impedance.

* * * * *